(12) United States Patent
Daley et al.

(10) Patent No.: US 11,045,381 B2
(45) Date of Patent: Jun. 29, 2021

(54) AUGMENTING HUMAN MOTION

(71) Applicant: Bose Corporation, Framingham, MA (US)

(72) Inventors: Michael J. Daley, Shrewsbury, MA (US); Zhen Sun, Allston, MA (US); Andrew J. Kuusisto, Greenville, NH (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/040,283

(22) Filed: Jul. 19, 2018

(65) Prior Publication Data
US 2019/0021934 A1    Jan. 24, 2019

Related U.S. Application Data

(60) Provisional application No. 62/535,202, filed on Jul. 20, 2017.

(51) Int. Cl.
*A61H 3/00* (2006.01)
*G09B 5/00* (2006.01)
*A61H 1/02* (2006.01)
*G09B 19/00* (2006.01)
*G09B 23/28* (2006.01)

(52) U.S. Cl.
CPC ............. *A61H 3/00* (2013.01); *A61H 1/0262* (2013.01); *A61H 1/0266* (2013.01); *G09B 5/00* (2013.01); *G09B 19/00* (2013.01); *G09B 19/003* (2013.01); *G09B 23/28* (2013.01); *A61H 2001/027* (2013.01); *A61H 2003/007* (2013.01); *A61H 2201/0157* (2013.01); *A61H 2201/1215* (2013.01); *A61H 2201/14* (2013.01); *A61H 2201/1642* (2013.01); *A61H 2201/1657* (2013.01); *A61H 2201/1669* (2013.01); *A61H 2201/5007* (2013.01); *A61H 2201/5061* (2013.01); *A61H 2205/12* (2013.01)

(58) Field of Classification Search
CPC ...... A61H 3/00; A61H 1/0262; A61H 1/0266; A61H 2001/027; A61H 2203/007; G09B 5/00; G09B 19/00; G09B 19/003
USPC .................................. 623/53, 54; 601/34, 27
See application file for complete search history.

(56) References Cited

U.S. PATENT DOCUMENTS

| 2010/0121232 A1* | 5/2010 | Sankai | B25J 9/0006 601/23 |
| 2010/0262044 A1* | 10/2010 | Siegler | A61B 5/1036 600/592 |
| 2018/0055711 A1* | 3/2018 | Choi | A61H 1/0244 |

* cited by examiner

*Primary Examiner* — Suba Ganesan
*Assistant Examiner* — Aren Patel
(74) *Attorney, Agent, or Firm* — Bose Corporation

(57) ABSTRACT

A system for augmenting the motion of a person includes an assistance apparatus with a first attachment for connecting the assistance apparatus to a first point on the person's body, a second attachment for connecting the apparatus to a second point on the person's body, an actuator for applying force between the first and second attachment points, the force augmenting motion of a part of the body, and a set of sensors detecting reaction force on the person's body when moving in the manner that the actuator augments. A control system implements a negative feedback loop, in which the force applied by the actuator is based on a weighted sum of measurements from the sensors, and is updated continuously based on the sensor measurements.

12 Claims, 8 Drawing Sheets

(a) (b) (c) (d) (e) (f)

(a) (b) (d) (e)

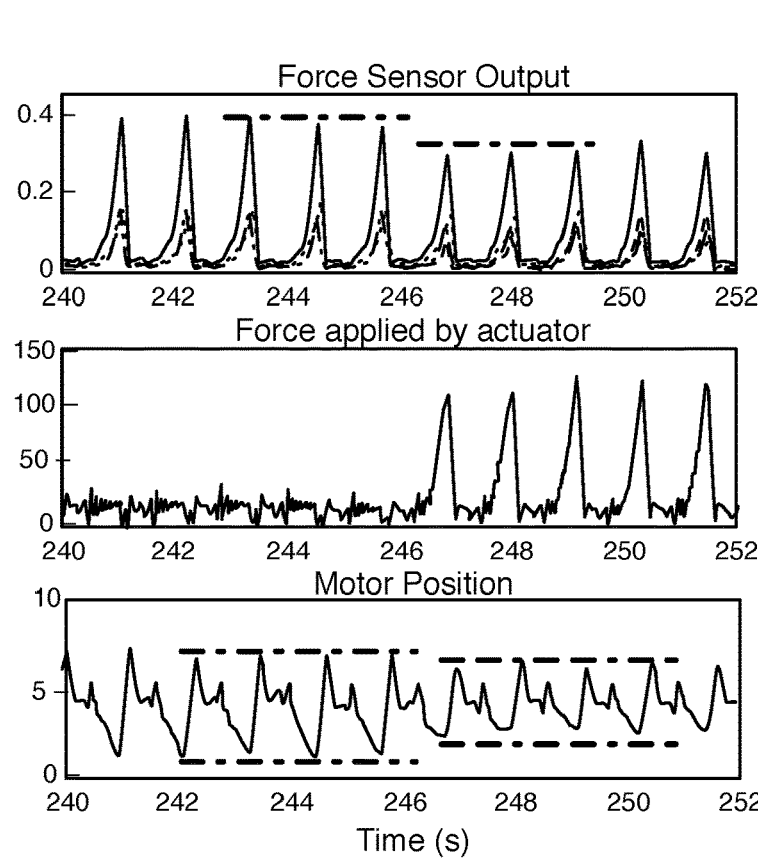
Fig. 12A
Fig. 12B
Fig. 12C
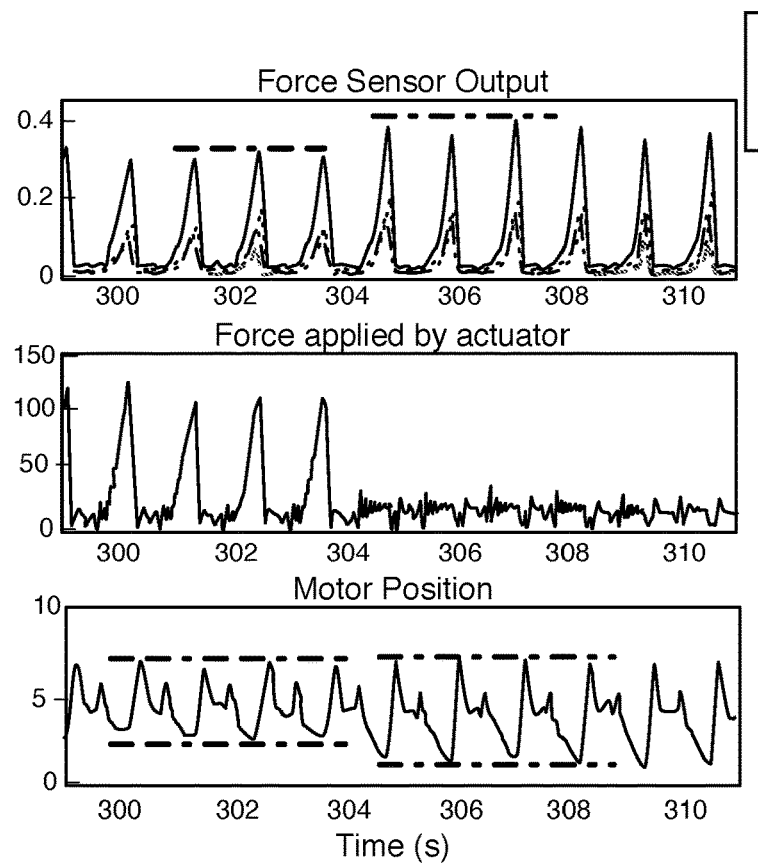
Fig. 13A
Fig. 13B
Fig. 13C

AUGMENTING HUMAN MOTION

PRIORITY

This application is a non-provisional continuation of provisional application 62/535,202, filed Jul. 20, 2017, the entire contents of which are incorporated by reference.

BACKGROUND

This disclosure relates to augmenting the motion of a person, such as stride, to decrease the effort of such motion.

Various attempts have been made to apply mechanical assistance to human motion, both therapeutically and to enhance normal functioning. One difficulty in assisting human motion is designing a control algorithm that provides the assistance in synchrony with the user's natural motion, so that the augmentation successfully assists the motion, rather than impeding it.

SUMMARY

In general, in one aspect, a system for augmenting the stride of a person includes a first assistance apparatus with a first attachment for connecting the first assistance apparatus to the person's first leg below the knee and above the ankle of the first leg, a second attachment for connecting the apparatus to the person's first foot, an actuator for applying force between the first and second attachment points, the force augmenting motion of the ankle, and a set of sensors detecting force between the plantar surface of the user's first foot and the ground. The set includes at least a first sensor under the outer edge of the foot, a second sensor under the ball of the foot, and a third sensor under the big toe. A control system implements a negative feedback loop, in which the force applied by the actuator is based on a weighted sum of measurements from the sensors, and is updated continuously based on the sensor measurements.

Implementations may include one or more of the following, in any combination. The second attachment may connect to the person's foot near the location of the distal end of the metatarsal bones. The second attachment may include an attachment to a shoe. The force applied by the actuator may apply downward torque at the ankle while the user's foot is applying force to the ground at the ball of the foot and the toes. The force applied by the actuator may apply upward torque at the ankle when the user's foot stops applying force to the ground, assisting lifting of the toes off the ground. The control system may compute the weighted sum of the measurements from the sensors by determining weights for each of the sensors that result in the sum of the weighted sensor measurements approximating a target profile for the torque applied by the ankle during a normal stride. The weights may be re-computed repeatedly while the user is walking.

A second assistance apparatus may include a first attachment for connecting the second assistance apparatus to the person's second leg below the knee and above the ankle, a second attachment for connecting the apparatus to the person's second foot, an actuator for applying force between the first and second attachment points, the force augmenting motion of the ankle, and a set of sensors detecting force between the plantar surface of the user's second foot and the ground. The control system may implement a second negative feedback loop, in which the force applied by the second actuator is based on a second weighted sum of measurements from the sensors of the second assistance apparatus, and is updated continuously based on the sensor measurements. The first and second weighted sums may be independent of each other.

In general, in one aspect, a system for augmenting the motion of a person includes an assistance apparatus with a first attachment for connecting the assistance apparatus to a first point on the person's body, a second attachment for connecting the apparatus to a second point on the person's body, an actuator for applying force between the first and second attachment points, the force augmenting motion of a part of the body, and a set of sensors detecting reaction force on the person's body when moving in the manner that the actuator augments. A control system implements a negative feedback loop, in which the force applied by the actuator is based on a weighted sum of measurements from the sensors, and is updated continuously based on the sensor measurements.

In general, in one aspect, a system for training a learner includes an instructor apparatus with a first set of sensors detecting motion of an instructor's body when moving in a particular manner, and a student apparatus, which includes a first attachment for connecting the student apparatus to a first point on the student's body, a second attachment for connecting the student apparatus to a second point on the student's body, an actuator for applying force between the first and second attachment points, the force augmenting motion of the type detected by the instructor apparatus's sensors, and a second set of sensors detecting reaction force on the student's body when moving in the manner that the actuator augments. A control and communication system communicates differences between the instructor's motion and the student's motion to at least one of the instructor and the student.

In general, in one aspect, a method for augmenting the motion of a person includes receiving data from a set of sensors detecting reaction force on the person's body when moving in the manner to be augmented, computing a weighted sum of measurements from the sensors, applying force between a first attachment connecting an assistance apparatus to a first point on the person's body and a second attachment connecting the apparatus to a second point on the person's body the force augmenting motion of a part of the body, the amount of force being based on the weighted sum, and repeatedly updating the force based on the sensor measurements.

Advantages include decreasing walking effort while feeling natural, extending the distance a user can walk or decreasing their fatigue after walking a given distance, increasing the speed they can walk, and decreasing the mechanical load on certain joints. Similar advantages are provided for other types of human motion.

All examples and features mentioned above can be combined in any technically possible way. Other features and advantages will be apparent from the description and the claims.

BRIEF DESCRIPTION OF THE DRAWINGS

FIGS. 12A, 12B, and 12C and 13A, 13B, and 13C show the sensor readings, force applied, and motor position, respectively, for the sensors of FIG. 8 and the device of FIG. 1, over several strides.

DESCRIPTION

Figure 2B:
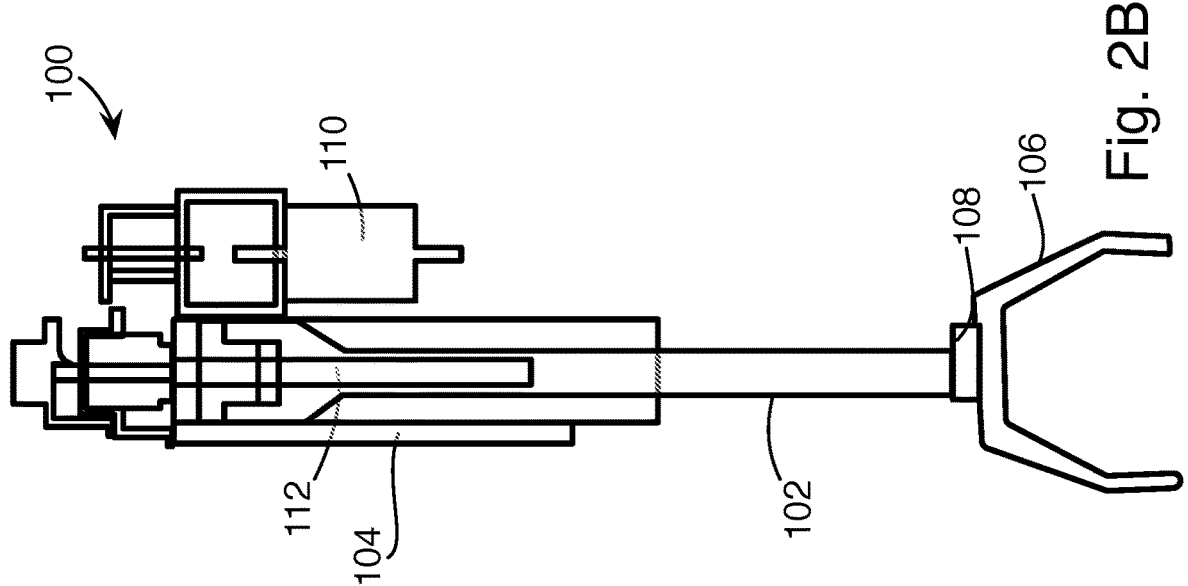
FIGS. 2A and 2B show a cross-sectional view of the device of FIG. 1, in retracted and extended positions, respectively.
Figure 2A:
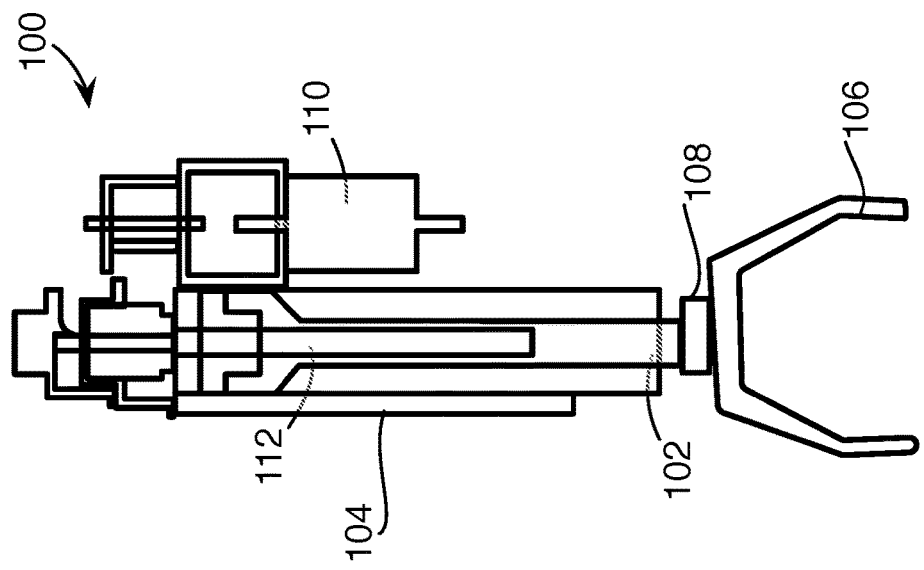
Figure 1:
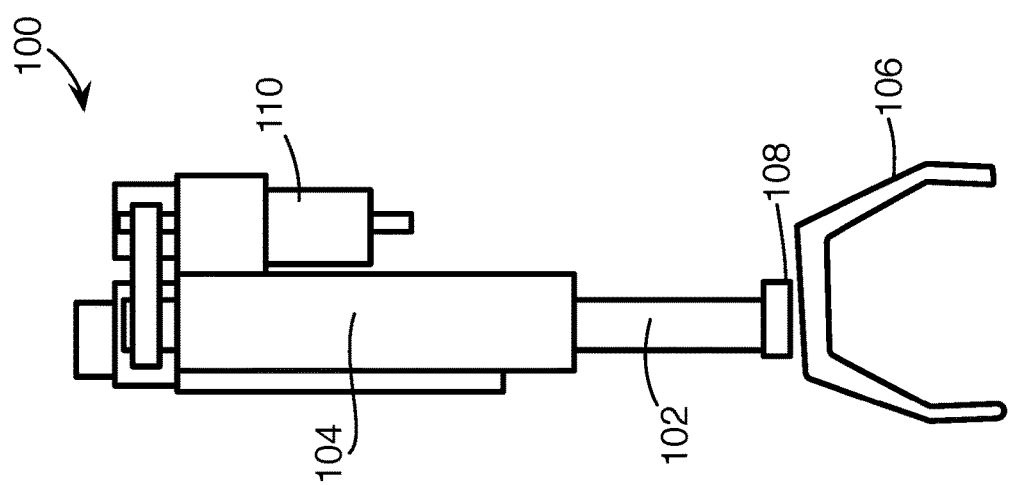
FIG. 1 shows an external view of a stride augmentation device.

FIG. 1 shows an actuator assembly for augmenting the stride of a human user. FIGS. 2A and 2B show a cross-sectional view of the same actuator fully-retracted and fully-extended. The actuator in FIG. 1 is at about the middle of its travel. As shown, the actuator 100 consists of an extending shaft 102 and a base housing 104, with the extending shaft coupled to a claw-shaped yoke 106 through a load cell 108. The yoke straddles a user's shoe, and is coupled to the sole or foot bed of the shoe on either side of the user's foot. The base housing is coupled to the users leg below the knee, as shown below. As the shaft of the actuator moves, it applies a force between the top of the user's shin and the end of their foot, thus applying a torque to the ankle. The amount of applied force is measured by the load cell 108, which may be a strain gauge or any other appropriate force sensor. In the particular example shown, the actuator 100 is driven by a rotary motor 110 located at the side of the base housing, and driving a screw 112 in the base housing to extend and retract the shaft. Other drive mechanisms could be used, such as a direct screw drive, a linear motor, a cable drive, or smart or active textiles, to give a few examples.

Figure 3A:
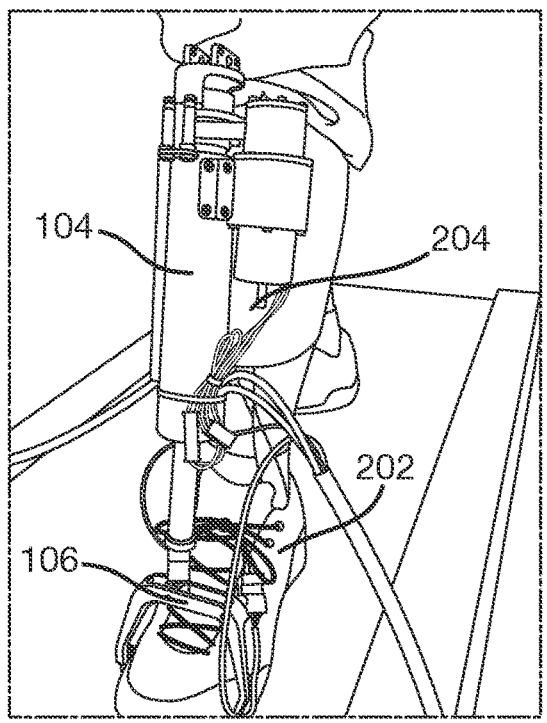
FIGS. 3A, 3B, and 3C show the device of FIG. 1 as worn by a person, at three different foot positions and from different angles.
Figure 3B:
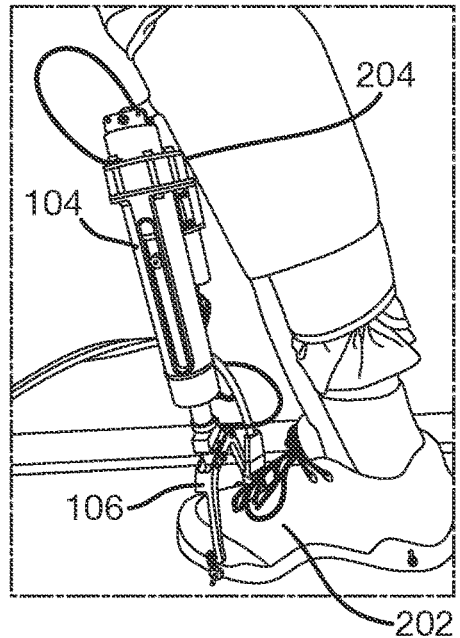
Figure 3C:
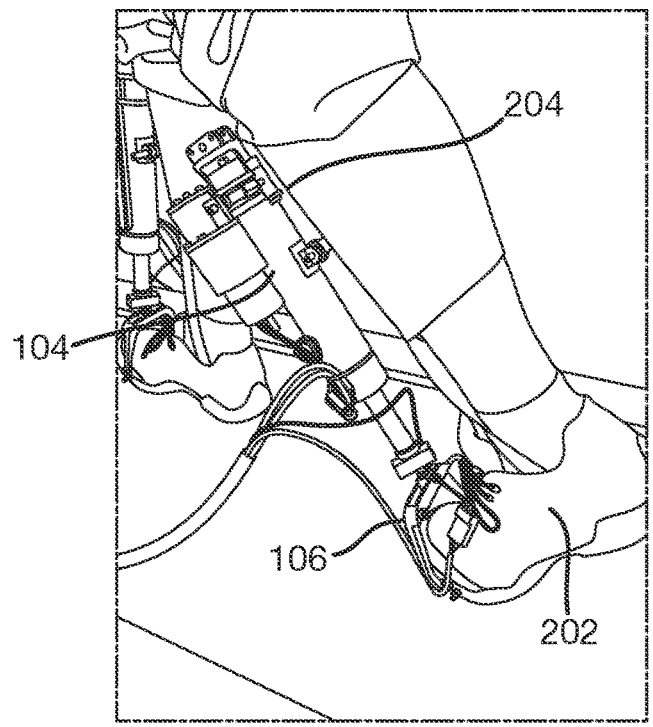

The attachment to the user's leg is shown in FIGS. 3A-3C. As noted above, the yoke 106 is connected to a shoe 202 on either side of the foot. In this particular example, a rod (not shown) passes through the sole of the shoe and through corresponding holes at either end of the yoke. This allows the yoke to apply force to the shoe, and to pivot as the shoe moves through the range of travel of the user's foot. The base housing 104 of the actuator is coupled to a shin guard-like fitting 204 that wraps around the user's lower leg, with a rigid plate over the shin bone and soft straps wrapping around the calf. In this way, the actuator applies force between the shin and the shoe below the region of the foot where the toes begin, i.e., around the distal end of the metatarsal bones of the foot. The shin guard distributes the force over the leg, so that the applied force is not confined to the points of attachment.

FIGS. 3A, 3B, and 3C show the actuator in use at three different positions, and from slightly different angles. FIG. 3A views the apparatus from the front, with the leg extended towards the viewer. FIG. 3B views the apparatus from the side, with the foot nearly flat and the leg leaning slightly forward. FIG. 3C views the apparatus from the side and rear, with the heel raised as if about to lift off.

Figure 4:
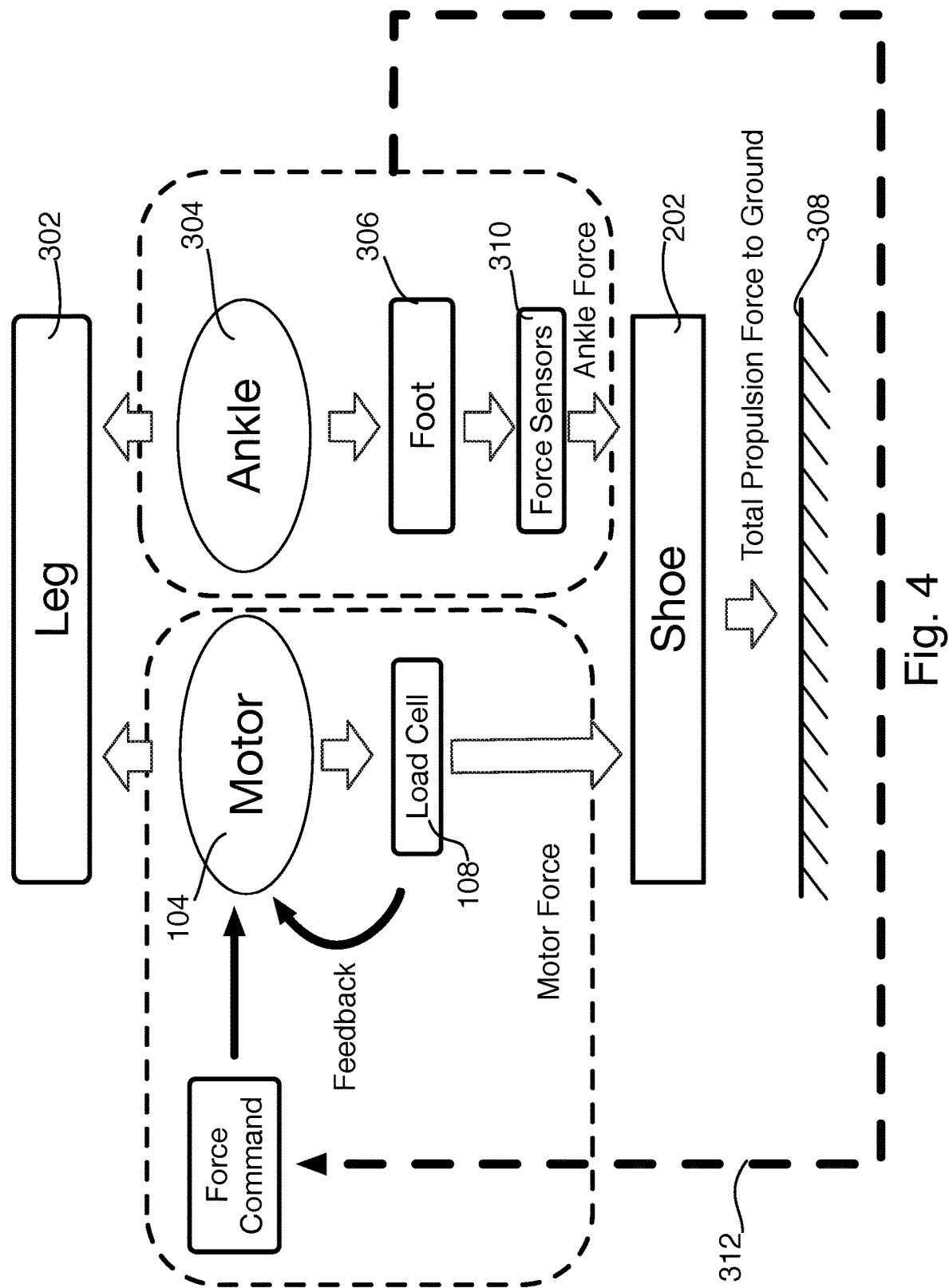
FIG. 4 shows a block diagram of the device of FIG. 1 in use and its control loop.

FIG. 4 shows a block diagram of the apparatus in use, i.e., attached to a leg and foot, and the control loop that is implemented to control it. From the top to the bottom, the anatomy is on the right side, with the leg 302, ankle 304, and foot 306, ending in the shoe 202 and ground 308. There are force sensors 310, discussed below, below the foot and above the bottom surface of the shoe. On the left, the actuator 104 (labelled "motor") connects the leg to the shoe, through a load cell 108 that measures the force applied by the actuator. The thick arrows identify forces: the motor and ankle both apply force upward against the leg. The motor applies force downward through the load cell and to the shoe; the ankle applies force downward through the foot and force sensors. The shoe applies force downward against the ground. During toe-lift, the forces are reversed to lift the toe off the ground. Only applied forces are shown—the opposite reaction forces are of course also present. The control loop 312 considers the output of the force sensors 310 and sends a force command to the actuator 104. A feedback loop between the load cell 108 and the actuator 104 is used to implement the force called for based on the sensor output. The derivation of the force command from the sensor output is detailed below.

Figure 5:
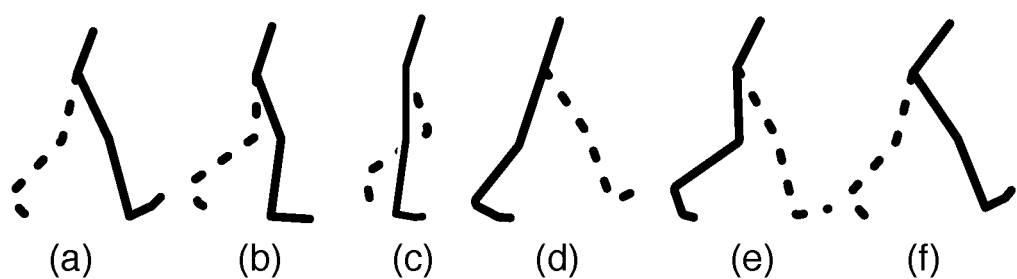
FIG. 5 is an illustration of the various stages of a human stride.
Figure 6:
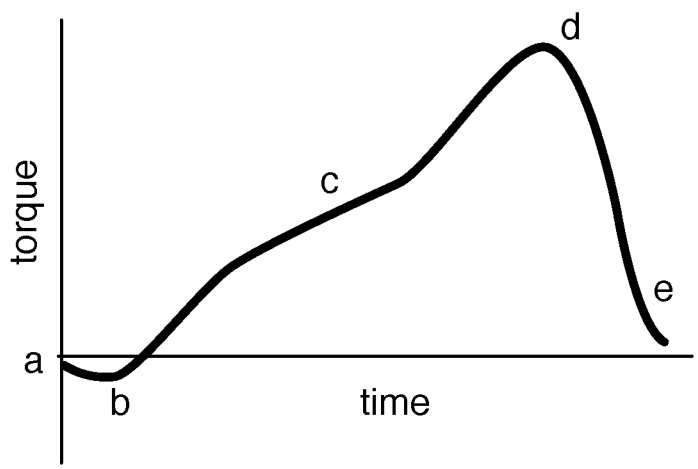
FIG. 6 is a graph of the torque at the ankle over the source of one stride.
Figure 7:
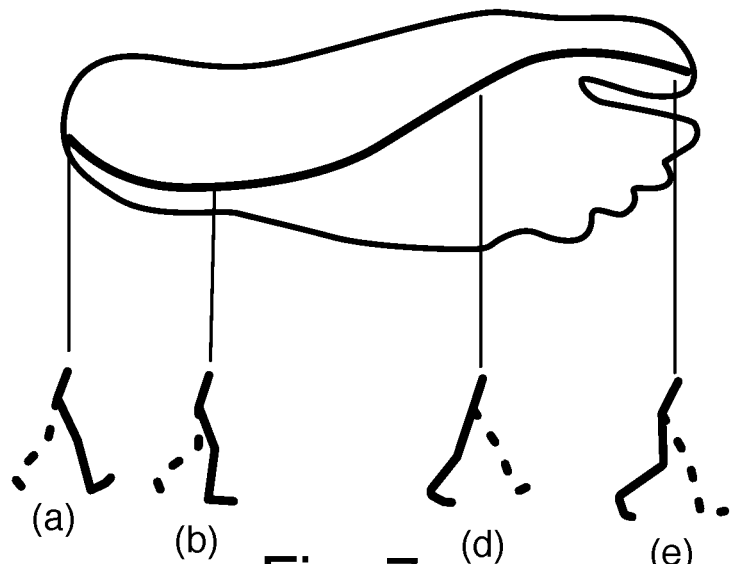
FIG. 7 is an illustration of the location of the force on the plantar surface of the foot over the course of one stride.

FIG. 5 shows the various stages of a normal human walking gait; the dashed line is the left leg, farther from the viewer. The stages of the gait or stride are:
  a) Heel contact
  b) Onset of dorsi-flexion
  c) Onset of dual-flexion
  d) Onset of plantar-flexion
  e) Terminal stance or toe-lift, and
  f) Swing FIG. 6 shows the torque at the ankle, in a typical person, at points (a) through (e), over the course of one stride, no torque being applied during (f) swing. As seen, the torque dips below zero (indicating lifting the foot) at (b), then rises (pressing the foot down) through (c) to (d), then drops rapidly back to near zero at (e) as the foot is lifted. FIG. 7 shows where, on the plantar surface of the foot, the force between foot and ground is highest during a typical stride. The force begins at the heel, sweeps from the outer (lateral) side of the rear of the foot to the inner (medial) side of the ball of the foot (first metatarsophalangeal joint), and through the large toe.

Figure 8:
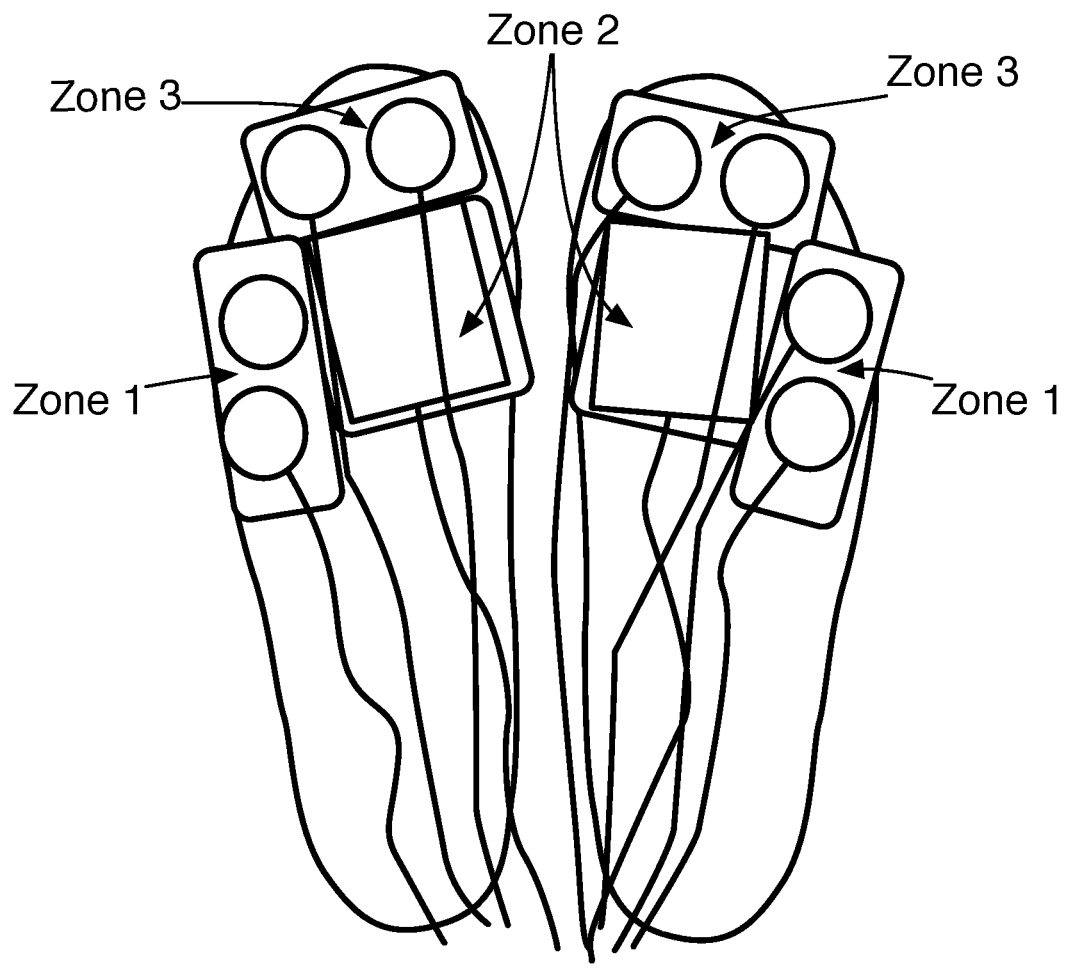
FIG. 8 shows instrumented shoe inserts for detecting the force between a user's feet and the ground.

The applicants have determined that to properly synchronize the force applied by the actuator with the user's natural gait, it is the later stages of the stride that need to be detected, and that this can be accomplished using sensors in three regions, as shown in FIG. 8. The sensors are arranged in three zones: zone 1, at the lateral side of the front of the foot, approximately detects the mid-stance transition from the back of the foot to the front. Zone 2, under the medial metatarsophalangeal joints, approximately detects the fore-foot loading. Zone 3, under the toes (and, in particular, the large and second or third toes), approximately detects toe-off, the end of the stride cycle. Other arrangements of sensors will work, as long as multiple points are used to detect the continuous motion through the relevant portion of the stride.

Figure 9A:
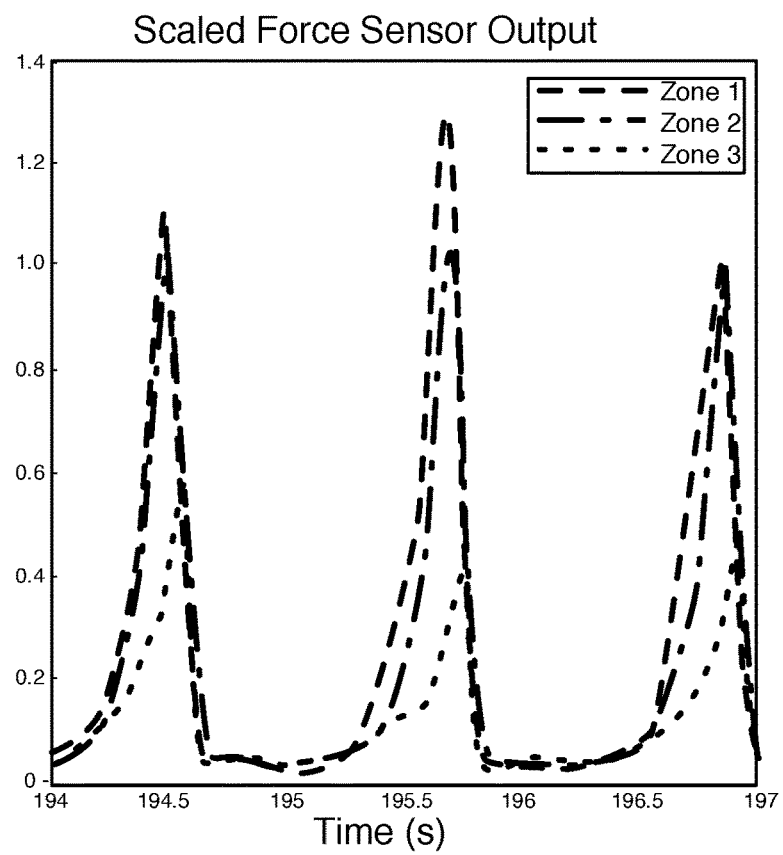
FIGS. 9A and 9B show the scaled readings of the sensors of FIG. 8 when used by two different people.
Figure 9B:
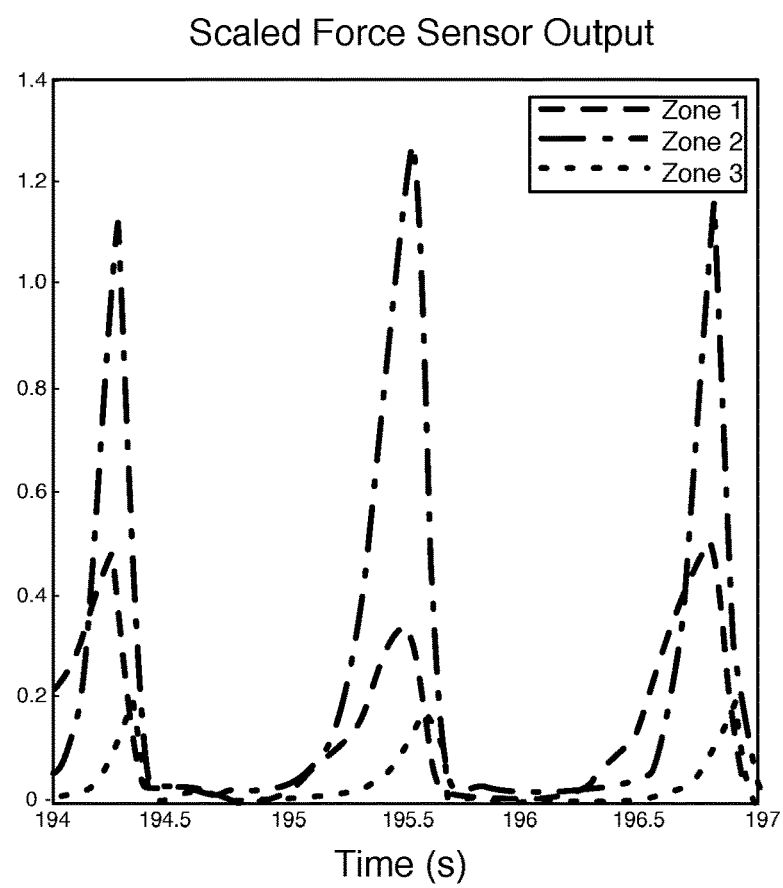
Figure 10:
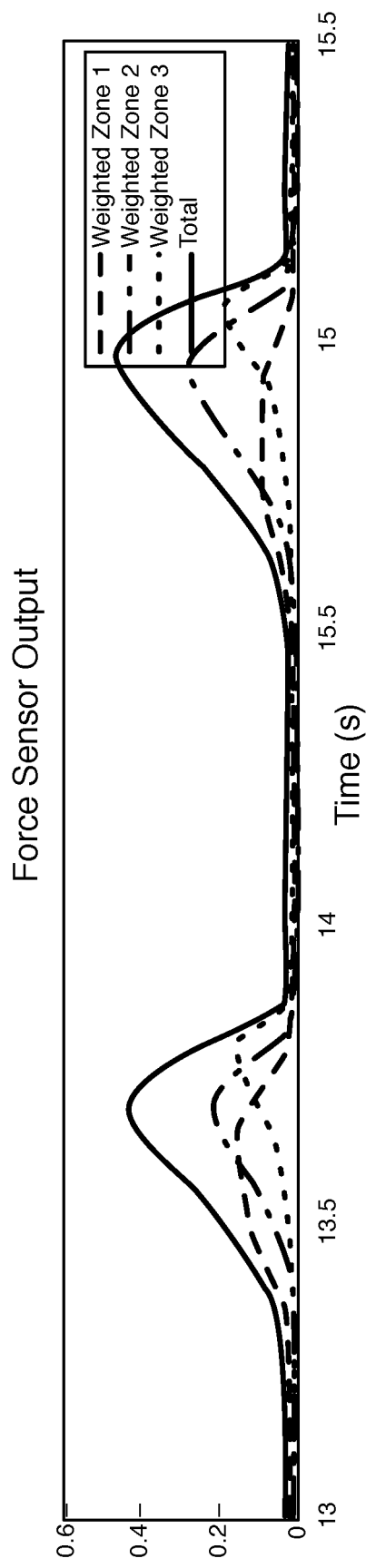
FIG. 10 shows a graph of the output of the sensors of FIG. 8 over the course of two strides.
Figure 11:
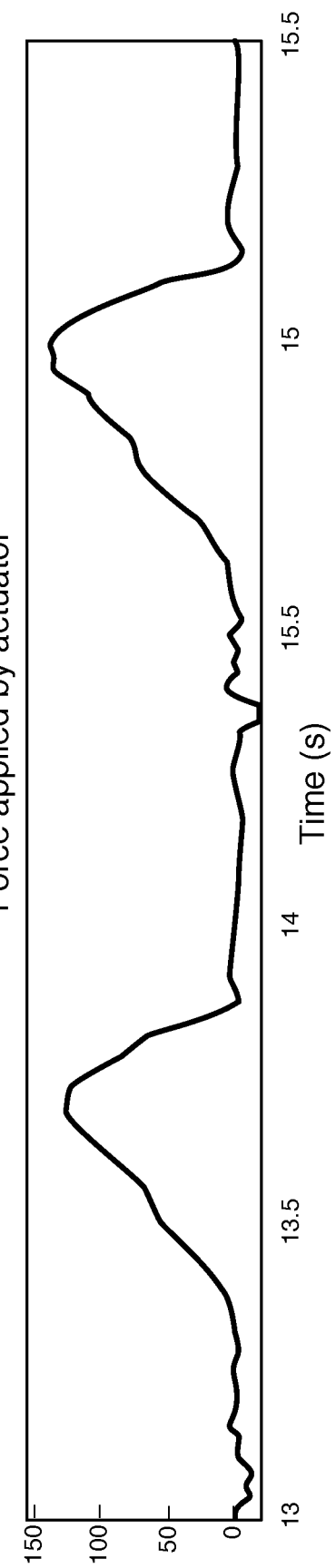
FIG. 11 shows a graph of the force applied by the device of FIG. 1 over the course of two strides.

FIGS. 9A and 9B show the scaled output of these three sensor zones across three strides of two different users. These graphs show that while a given user has a similar force profile across strides, different users have very different force profiles from each other. To combine the sensor outputs into a control input, the three sensor zones are each weighted, according to a user-specific weighting, so that their sum approximates the shape of the torque profile shown in FIG. 6. The weighting is a simple matter of curve-fitting, that is, finding the weights for each of the three curves that causes their sum to fit the target profile of FIG. 6. While it can be set once for a given user after acquiring data over a few strides, it may also be done continuously or periodically as the user walks, so that variations in stride are promptly incorporated. The output of the weighting is shown in FIG. 10, with the upper curve showing the raw values and the weighted sum of the three zone sensor outputs. This weighted sum is used to provide the force command to the actuator, which then results in the torque shown in FIG. 11 being applied to the foot. As this torque matches the torque naturally applied by the ankle, the result is that the foot puts out less fore, and the ankle experiences less torque, as shown in the remaining figures. In addition, when the sensors show that the user is in the toe-lift phase, indicated by the lack of reaction force on the bottom of the foot, the actuator applies a negative force, helping lift the toe. This addresses a common problem, where a fatigued person does not sufficiently lift their toe, and is more prone to tripping.

FIGS. 12A, 12B, and 12C show the raw sensor readings and weighted sum, applied force, and motor position across ten strides, when the actuator is switched on after five strides (see FIG. 12B). It can be clearly observed that the forces applied to the foot decreases once the actuator is activated. It can also be observed that the range of the motor position—the amount of total flexion of the foot—also decreases when the actuator is in use. FIGS. 13A, 13B, and 13C show the opposite effects when the actuator is turned off—force and travel both increase. This shows that applying torque to the ankle based on the weighted sum of the three sensor zones results in less force and less extension of the ankle than when the system is not aiding the user.

Because all the cues in this algorithm are coming from the current stride, correct timing of the assistive force is maintained. The control loop is able to accommodate variations in user's gait, such as varying speed or changing inclines. Another benefit of using the weighted sum of the sensor outputs is that because it is proportional only to the foot reaction force, it is able to provide assistance to other ankle-based activities, such as standing on tip toes, jumping, or running. Test subjects report that walking with the actuator engaged feels natural and is less fatiguing than normal walking, and the effect is particularly felt when walking up inclines. As a result, a given user is potentially able to walk farther, or faster, or to be less fatigued after a given walk, than without the apparatus.

The above solutions can be generalized to assisting motion of other parts of the body. Specifically, using an array of sensors that detect the flow of a reaction force resulting from a particular motion, including motion involving more than one joint, a control loop can control one or more actuators that apply external force complementing that motion and properly timed application of force to assist, in a manner that feels natural to the user. The benefits are similar—allowing the user to perform given motions longer or with less fatigue, or to enhance their ability, such as how much they can lift without injury.

Another application of this technology is in physical education. An instructor can wear the sensors alone, while a student wears both the sensors and the actuator. As the student attempts to mimic the instructor, the weighted sums of the sensor readings are compared, and the student's actuator is used to guide the student to matching the motion of the instructor. This could be used therapeutically, such as in physical or occupational therapy, or simply for instruction, such as in yoga, dance, sports training, or martial arts. It can also allow long-distance or telepresence-based training or therapy, as there is no requirement that the instructor and student be at the same location.

Embodiments of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, hard disks, optical disks, solid-state disks, flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. A system for augmenting the stride of a person, comprising:
   a first assistance apparatus comprising:
   a first attachment for connecting the first assistance apparatus to the person's first leg below the knee and above the ankle of the first leg;
   a second attachment for connecting the apparatus to the person's first foot;
   an actuator for applying force between the first and second attachment points, the force augmenting motion of the ankle; and
   a set of sensors detecting force between the plantar surface of the user's first foot and the ground, the set including at least a first sensor under the outer edge of the foot, a second sensor under the ball of the foot, and a third sensor under the big toe; and
   a control system implementing a negative feedback loop, in which the force applied by the actuator is based on a weighted sum of measurements from the sensors, and is updated continuously based on the sensor measurements.

2. The system of claim 1, wherein the second attachment connects to the person's foot near the location of the distal end of the metatarsal bones.

3. The system of claim 1, wherein the second attachment comprises an attachment to a shoe.

4. The system of claim 1, wherein the force applied by the actuator applies downward torque at the ankle while the user's foot is applying force to the ground at the ball of the foot and the toes.

5. The system of claim 1, wherein the force applied by the actuator applies upward torque at the ankle when the user's foot stops applying force to the ground, assisting lifting of the toes off the ground.

6. The system of claim 1, wherein the control system computes the weighted sum of the measurements from the sensors by determining weights for each of the sensors that result in the sum of the weighted sensor measurements approximating a target profile for the torque applied by the ankle during a normal stride.

7. The system of claim 6, wherein the weights are re-computed repeatedly while the user is walking.

8. The system of claim 6, wherein the control system determines the weights for each of the sensors continuously or periodically as the user walks, so that variations in stride are promptly incorporated.

9. The system of claim 1, further comprising:
a second assistance apparatus comprising:
a first attachment for connecting the second assistance apparatus to the person's second leg below the knee and above the ankle;
a second attachment for connecting the apparatus to the person's second foot;
an actuator for applying force between the first and second attachment points, the force augmenting motion of the ankle; and
a set of sensors detecting force between the plantar surface of the user's second foot and the ground, the set including at least a first sensor under the outer edge of the foot, a second sensor under the ball of the foot, and a third sensor under the big toe; and
wherein the control system implements a second negative feedback loop, in which the force applied by the second actuator is based on a second weighted sum of measurements from the sensors of the second assistance apparatus, and is updated continuously based on the sensor measurements.

10. The system of claim 9, wherein the first and second weighted sums are independent of each other.

11. A system for augmenting the motion of a person, comprising:
an assistance apparatus comprising:
a first attachment for connecting the assistance apparatus to a first point on the person's body;
a second attachment for connecting the apparatus to a second point on the person's body;
an actuator for applying force between the first and second attachment points, the force augmenting motion of a part of the body; and
a set of sensors detecting reaction force on the person's body when moving in the manner that the actuator augments; and
a control system implementing a negative feedback loop, in which the force applied by the actuator is based on a weighted sum of measurements from the sensors, and is updated continuously based on the sensor measurements.

12. A method for augmenting the motion of a person, comprising:
receiving data from a set of sensors detecting reaction force on the person's body when moving in the manner to be augmented;
computing a weighted sum of measurements from the sensors;
applying force between a first attachment connecting an assistance apparatus to a first point on the person's body and a second attachment connecting the apparatus to a second point on the person's body the force augmenting motion of a part of the body;
the amount of force being based on the weighted sum; and
repeatedly updating the force based on the sensor measurements.

* * * * *